(12) United States Patent
Duarte

(10) Patent No.: US 6,829,139 B1
(45) Date of Patent: Dec. 7, 2004

(54) ADJUSTABLE DATA PROCESSING DISPLAY

(75) Inventor: Matias Duarte, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 0 days.

(21) Appl. No.: 10/263,146

(22) Filed: Oct. 1, 2002

(51) Int. Cl.[7] ............................................. G06F 1/16
(52) U.S. Cl. .................................. 361/681; 361/379
(58) Field of Search ................................ 361/679–681, 361/683, 686

(56) References Cited

U.S. PATENT DOCUMENTS

| | | |
|---|---|---|
| 4,237,540 A | 12/1980 | Sato |
| 5,224,060 A | 6/1993 | Ma |
| 5,268,817 A | 12/1993 | Miyagawa et al. |
| 5,278,779 A | 1/1994 | Conway et al. |
| 5,345,362 A * | 9/1994 | Winkler ...................... 361/681 |
| 5,548,478 A | 8/1996 | Kumar et al. |
| 5,638,257 A | 6/1997 | Kumar et al. |
| 5,900,848 A | 5/1999 | Haneda et al. |
| 5,901,035 A | 5/1999 | Foster |
| 5,905,550 A | 5/1999 | Ohgami et al. |
| 5,949,408 A | 9/1999 | Kang et al. |
| 6,020,878 A * | 2/2000 | Robinson ..................... 345/173 |
| 6,125,040 A | 9/2000 | Nobuchi et al. |
| 6,433,777 B1 | 8/2002 | Sawyer |
| 6,446,004 B1 | 9/2002 | Cao et al. |
| 6,483,445 B1 * | 11/2002 | England ....................... 341/22 |
| 6,507,336 B1 | 1/2003 | Lunsford |
| 6,525,715 B2 | 2/2003 | Uchiyama et al. |
| 6,618,044 B1 | 9/2003 | Gettemy et al. |
| 6,622,031 B1 | 9/2003 | McCleary et al. |
| 6,665,173 B2 | 12/2003 | Brandenberg et al. |

OTHER PUBLICATIONS

Suzuki et al. (US 2002/0075281 A1), "Image Transferring Apparatus and Method, File Transferring Apparatus and Method, and Program Storage Medium," Jun. 20, 2002.*

Bradenbert, et al., "Physical Configuration Of A Handheld Electronic Communication Device", Provisional Patent Application Filed Dec. 20, 1999, U.S. Provisional Application No: 60/172,675.

* cited by examiner

Primary Examiner—Yean-Hsi Chang
(74) Attorney, Agent, or Firm—Blakely, Sokoloff, Taylor & Zafman, LLP.

(57) ABSTRACT

An apparatus is disclosed comprising: a data processing device; a swing arm having a first end and a second end, rotatably coupled to the data processing device at the first end and rotatable through a specified angle from a first position to a second position; and a display rotatably coupled to the support arm at the second end, the display being in a first viewable position covering a first set of input elements when the swing arm is in the first position and being in a second viewable position exposing the one or more input elements when the swing arm is in the second position.

16 Claims, 5 Drawing Sheets

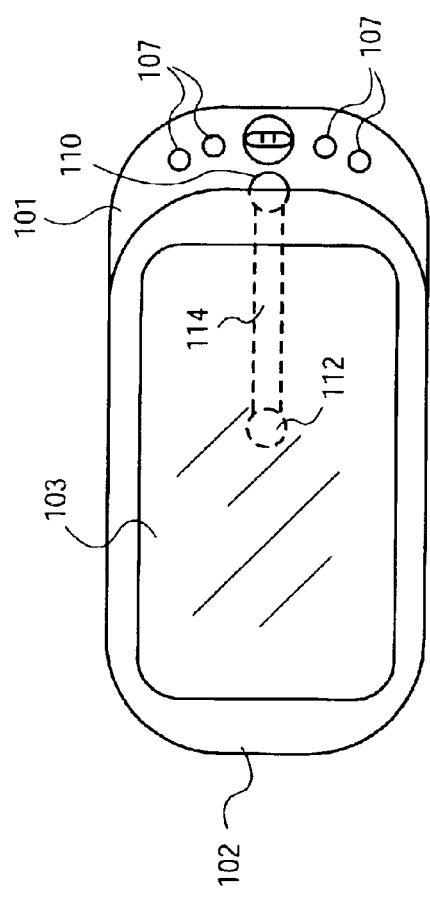
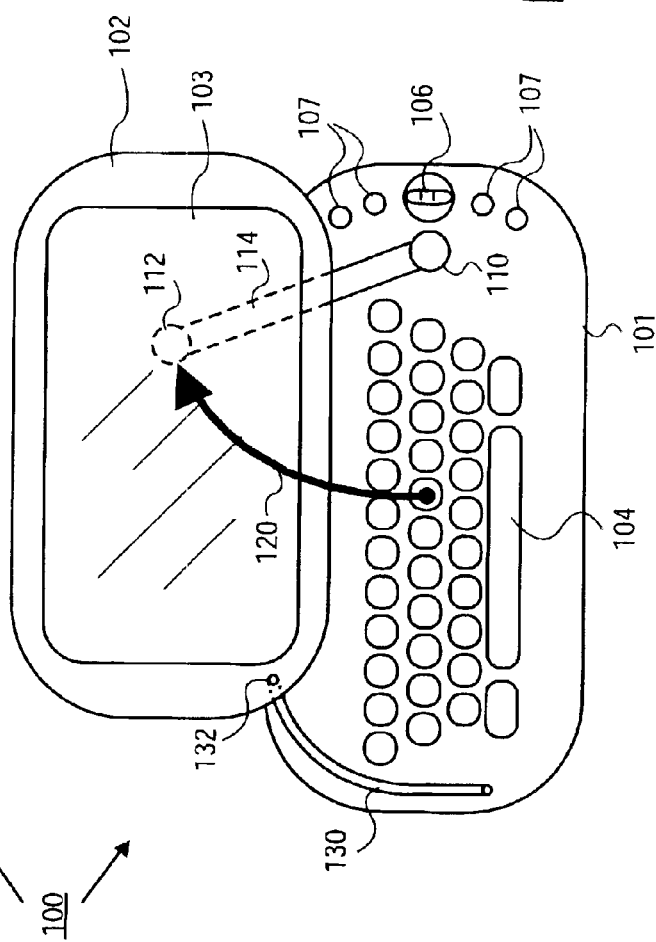
FIG. 1a
FIG. 1b

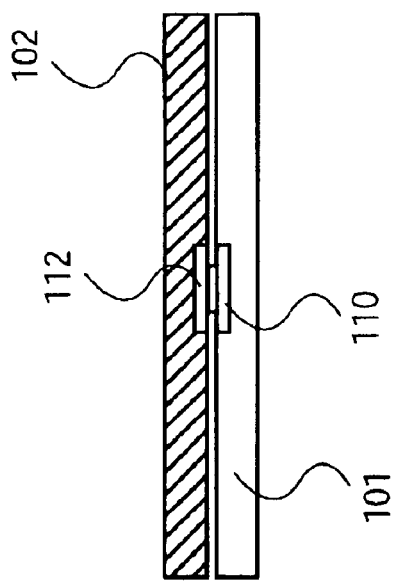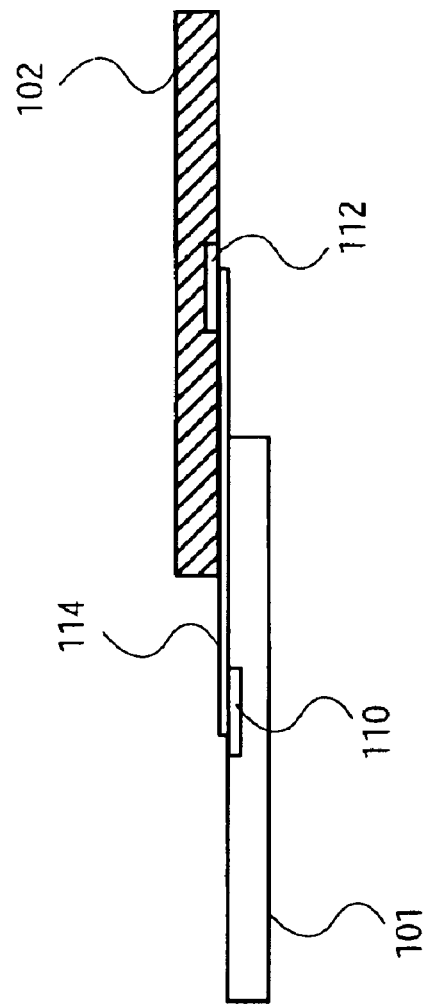

ADJUSTABLE DATA PROCESSING DISPLAY

BACKGROUND OF THE INVENTION

1. Field of the Invention

This invention relates generally to the field of data processing devices. More particularly, the invention relates to an adjustable display for a data processing device.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To deal with this problem, devices have been produced which physically adjust to an "active" position when in use and an "inactive" position when not in use. For example, the well-known Motorola® Star-TAC® wireless telephone flips open when in use, thereby exposing a telephone keypad, a display and and earpiece. However, when this device retracts to an "inactive" position, the keypad, display, and earpiece are all completely inaccessible.

Accordingly, what is needed is an improved, adjustable data processing display for a data processing device.

SUMMARY

An apparatus is disclosed comprising: a data processing device; a swing arm having a first end and a second end, rotatably coupled to the data processing device at the first end and rotatable through a specified angle from a first position to a second position; and a display rotatably coupled to the support arm at the second end, the display being in a first viewable position covering a first set of input elements when the swing arm is in the first position and being in a second viewable position exposing the one or more input elements when the swing arm is in the second position.

BRIEF DESCRIPTION OF THE DRAWINGS

A better understanding of the present invention can be obtained from the following detailed description in conjunction with the following drawings, in which:

FIGS. 1a and 1b illustrate a frontal view of one embodiment of the invention.

FIGS. 2a and 2b illustrate a side view of one embodiment of the invention.

DETAILED DESCRIPTION OF PREFERRED EMBODIMENTS

Figure 3A:
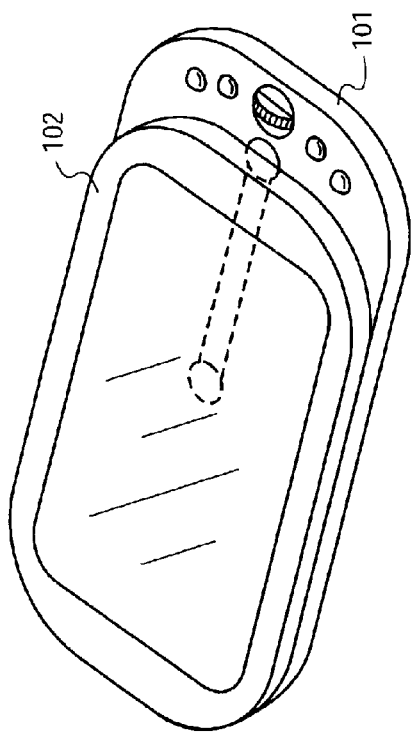
FIGS. 3a and 3b illustrate a perspective view of one embodiment of the invention.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of an Adjustable Data Processing Display

Illustrated in FIGS. 1a and 1b, is one embodiment of a data processing device 100 comprising an adjustable display 102 and a base 101. The base of the data processing device comprises comprises a keyboard 104, a control knob/wheel 106 (e.g., for scrolling between menu items and/or data objects), and a set of control buttons 107 (e.g., for selecting menu items and/or data). In one embodiment, the alphanumeric keys on the keyboard are organized in the same order as they would appear on a standard keyboard, such as in a standard QWERTY or a DVORAK keyboard, thereby enabling the user to efficiently enter alphanumeric characters without searching for the keys. It should be noted, however, that the specific control knob, control button and keyboard configuration illustrated in FIGS. 1a-b is not required for complying with the underlying principles of the invention. Various alternative input configurations may be employed.

In one embodiment, the display 102 is rotatably coupled to the data processing device 100 via an arm 114. Specifically, the arm 114 is coupled to the display 102 at a first rotation point 112 and to the base 101 of the data processing device 100 at a second rotation point 110. The rotational coupling of the arm 114 to the base 101 and display 102 may be a standard rotational hinge or any other known rotational interconnection.

FIG. 1a illustrates the adjustable display 102 in a "closed" position and FIG. 1b illustrates the adjustable display 102 in an "open" position. When in a closed position, the adjustable display 102 covers the keyboard 104 thereby decreasing the size of the device 100 and protecting the keyboard 104. Even when the display is in a closed position, however, the control knob 106 and control buttons 107 are exposed and therefore accessible by the user and the display screen 103 is still viewable. The motion of the display 102 from a closed position to an open position is indicated by motion arrow 120 illustrated in FIG. 1b. Accordingly, it will be appreciated that the display is viewable, and data is accessible by the user in both an open and a closed position (although access to the keyboard is only provided in an open position).

In one embodiment, a track 130 is formed on the base 101 of the data processing device. A pin 132 formed on the display 102 cooperatively engages with the track 130 to guide the display 102 as it moves from a closed to an open position.

In one embodiment, the screen 103 employed on the display 102 is a liquid crystal display ("LCD") screen. However, various alternative technologies may be employed on the display screen 103 such as, for example, thin-film transistor ("TFT") technologies while still complying with the underlying principles of the invention.

In one embodiment, a switch within the device 100 (not shown) is triggered when the adjustable display 102 is moved from an open position to a closed position (or from a closed position to an open position). In one embodiment, hardware/software within the device 100 may be configured to enter into a different mode based on the position of the switch. For example, a different user interface (or other operating system or application-level function) may be triggered based on the position of the switch. In one embodiment, when the display is moved into a closed position, a user interface is displayed which is more easily navigable with only the control buttons 107 and control knob 106 (i.e., without the use of the keyboard 104). Various other interface functions may be triggered by the switch while still complying with the underlying principles of the invention. Various different types of switches may be employed on the device 100 including standard mechanical switches, electrical switches (e.g., capacitive/magnetic switches), or any combination thereof.

If standard electrical wiring is used to electrically couple the base 101 of the data processing device 100 to the display 102, the areas surrounding the two rotation points 110 and 112 should be wide enough to accommodate the wiring. However, a wireless connection may also be employed between the data processing device base 101 and the display while still complying with the underlying principles of the invention. For example, the display 102 may be communicatively coupled to the base 101 via a Bluetooth connection, an IEEE 802.11a or 802.11b connection, a capacitive communication coupling, and/or any other type of wireless link. If configured with a wireless connection, the display 102 may also be detachable from the base 101.

The control knob 106 and control buttons 107 may be programmed to perform various functions within applications executed on the data processing device 100. For example, if an email client application is executed on the device 100, the control knob 106 may be configured to scroll a highlight element through the list of e-mail messages within the user's inbox (i.e., to highlight a particular e-mail message). One of the control buttons 107 (or the control knob 106) may then be configured to select the highlighted e-mail message. A different control button may be configured as a "back" button, allowing the user to back out of selected e-mail messages and/or to move up through the menu/folder hierarchy. A third control button may be configured to bring the user to a desired location within the e-mail application (e.g., to the top of the menu/folder hierarchy) or within the operating system executed on the processing device 100. In one embodiment, the particular functions to be executed by the buttons 107 and/or control knob 106 may be selected by the end-user.

Figure 3B:
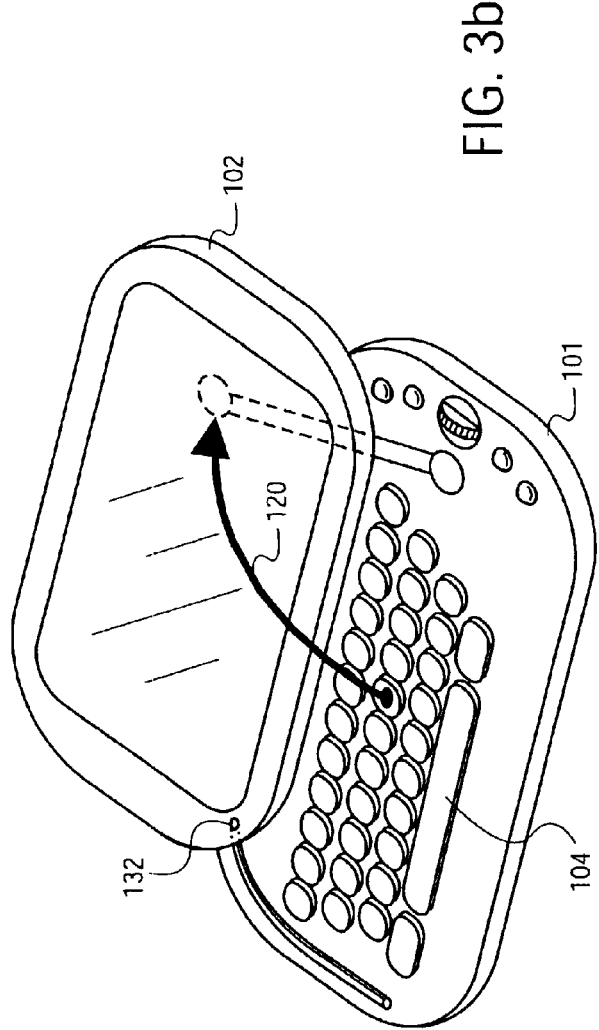

A side view of one embodiment of the data processing device is illustrated in both a closed and open position in FIGS. 2a and 2b, respectively. In addition, a perspective view of the data processing device is illustrated in a closed an open position in FIGS. 3a and 3b, respectively.

An Exemplary Network Architecture

Figure 4:
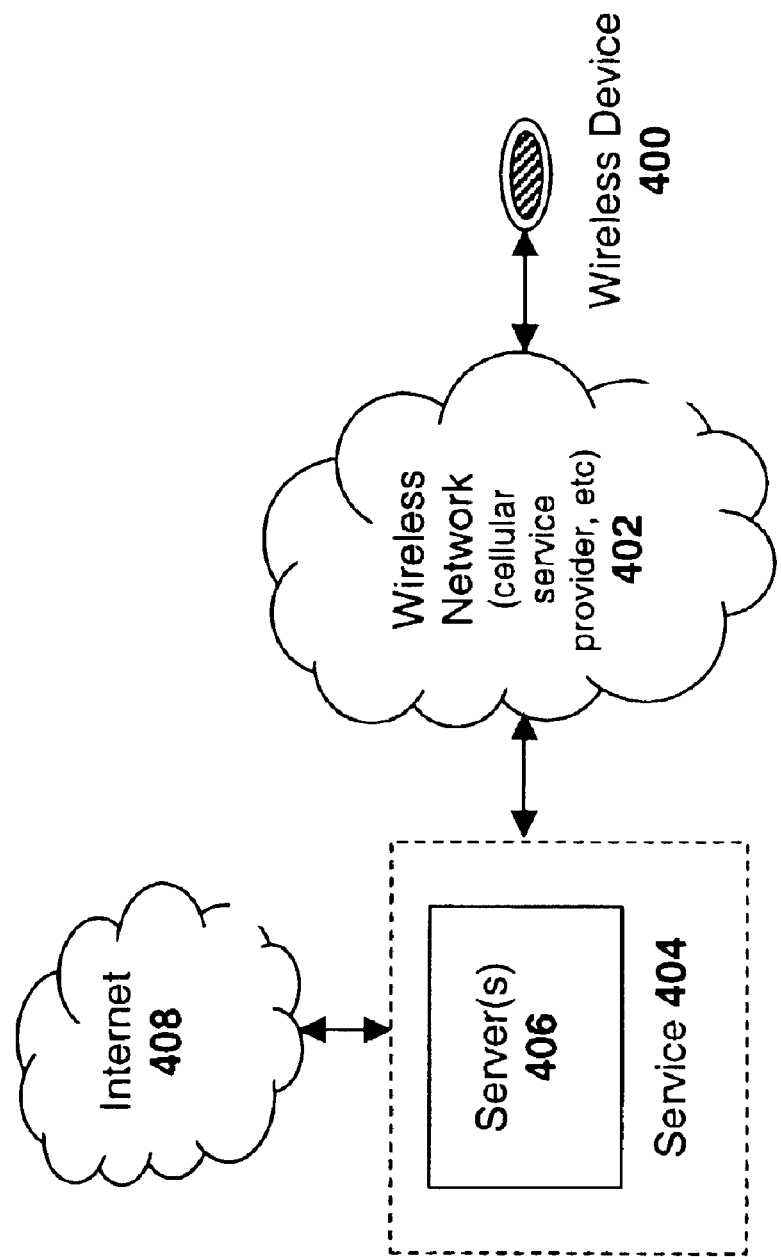
FIG. 4 illustrates a network architecture in which one embodiment of the wireless device is employed.

As illustrated in FIG. 4, in one embodiment, the adjustable display is employed on a wireless data processing device 400. According to this embodiment, the wireless data processing device 400 communicates with a data service 404 comprised of one or more servers 406 over a wireless network 402. The data service 404 may manage various types of data on behalf of the user of the wireless device 400 (e.g., email, electronic calendar, to-do list . . . etc) and may provide the wireless data processing device 400 with program code such as applications and/or operating system upgrades. The data service 404 may also act as a proxy to connect the wireless device 400 to other servers over the Internet 408. In one embodiment, the service 404 converts data and program code requested from the Internet into a format which the data processing device 400 can properly interpret. For example, the service 404 may convert images embedded within Web pages into an imaging format which the data processing device can display (e.g., by adjusting grayscale level, resolution, . . . etc). As such, in this embodiment, the service 404 has an intimate knowledge of the capabilities/configuration of each wireless device 400, and formats data/content requested from the Internet accordingly.

The wireless device 400 may communicate with the service 404 using various RF communication protocols/techniques. For example, in one particular embodiment, the wireless device 400 transmits and receives data to/from a cellular network via a cellular packet-switched protocol such as the cellular digital packet data ("CDPD") standard. Embodiments of the wireless device may also be configured to transmit/receive data using a variety of other communication standards including 2-way paging standards and third generation ("3G") wireless standards (e.g., UTMS, CDMA 2000, NTT DoCoMo, . . . etc).

An Exemplary Hardware Architecture

Figure 5:
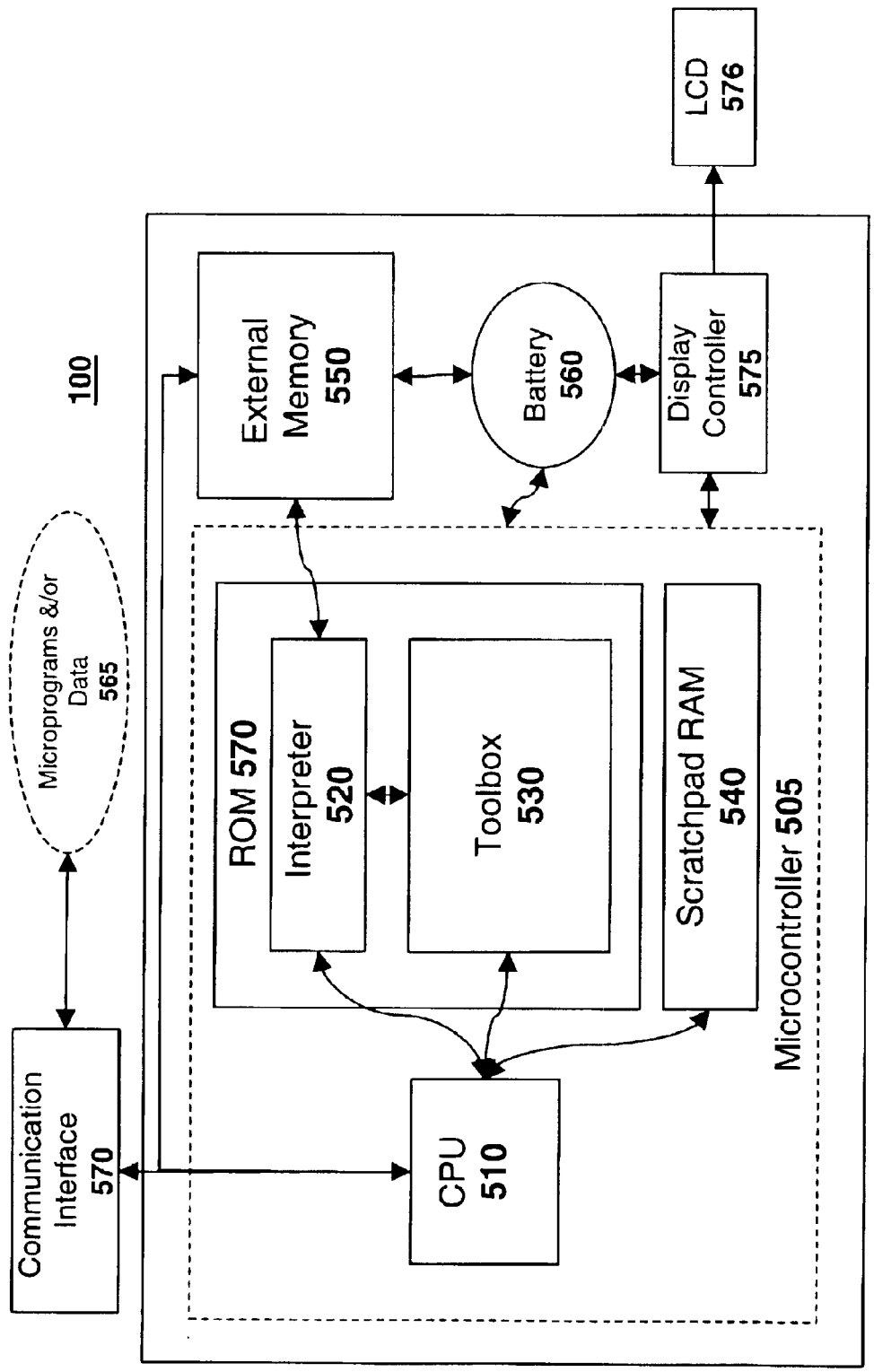
FIG. 5 illustrates a hardware architecture of one embodiment of the wireless device.

As illustrated in FIG. 5, one embodiment of the data processing device 100 is comprised generally of a microcontroller 505, an external memory 550, a display controller 575, and a battery 560. The external memory 550 may be used to store programs and/or data 565 transmitted to the portal device 100 from the data service 404. In one embodiment, the external memory 550 is nonvolatile memory (e.g., an electrically erasable programmable read only memory ("EEPROM"); a programmable read only memory ("PROM"), . . . etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the data processing device 100 will notify the user and/or the data service 404. The data service 404 may then automatically send the user a new battery.

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the data processing device 100. These routines include drawing text and graphics on the data processing device's display 102, decompressing data transmitted from the data service 404, reproducing audio on the portal device 100, and performing various input/output and communication functions.

In one embodiment, microprograms and portal data 565 are transmitted from the data service 404 to the external memory 550 of the portal device via a communication interface 570 under control of the CPU 510. Various wired and wireless communication interfaces 570 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the portal device 100 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows portal devices 100 with different CPUs to coexist and execute the same microprograms. Moreover, programming frequently-used routines in the ROM toolbox module 530 reduces the size of microprograms stored in the external memory 550, thereby conserving memory and bandwidth when communicating with the data service 404. In one embodiment, new interpreter modules 520 and/or toolbox routines 530 may be developed to execute the same microprograms on cellular phones, personal information managers ("PIMs"), or any other device having a CPU and memory.

One embodiment of the ROM 570 may be comprised of interpreted code as well as native code written specifically for the microcontroller CPU 510. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. An apparatus comprising:
    a data processing device; and
    a swing arm having a first end and a second end, rotatably coupled to said data processing device at said first end and rotatable through a specified angle from a first position to a second position;
    a display rotatably coupled to said support arm at said second end, said display being in a first viewable position covering a first set of input elements when said swing arm is in said first position and being in a second viewable position exposing one or more said input elements when said swing arm is in said second position;
    a track formed on said processing device; and
    a pin formed on said display and cooperatively engaged with said track to guide said display between said first position and said second position.

2. The apparatus as in claim 1 wherein a plane defined by said display is substantially parallel to a plane defined by the length and width of said data processing device.

3. The apparatus as in claim 1 wherein said first set of input elements comprise a QWERTY keyboard.

4. The apparatus as in claim 3 wherein said data processing device comprises a second set of input elements which remain exposed when said display is in said first viewable position.

5. The apparatus as in claim 4 wherein said second set of input elements comprise a rotatable input knob and a set of input buttons.

6. The apparatus as in claim 4 further comprising:
    a switch configured to trigger when said display is moved from said first viewable position to said second viewable position.

7. The apparatus as in claim 6 further comprising:
    user interface selection logic to select new user interface functions responsive to said switch triggering.

8. An apparatus, comprising:
    a data processing device;
    a display; and
    display guiding means comprising
    a swing arm having a first end and a second end, rotatably coupled to said data processing device at said first end and rotatable coupled to said display at said second end, the swing arm rotatable through a specified angle from a first position to a second position thereby moving said display between a closed position and an open position;
    a track formed on said processing device; and
    a pin formed on said display cooperatively engaged with said track to guide said display from said closed position to said open position, wherein in said closed position said display covers a first group of input elements on said data processing device and wherein in said open position said display exposes said first group of input elements on said data processing device, wherein said first group of input elements comprises an alphanumeric keyboard.

9. The apparatus as in claim 8 wherein said data processing device comprises a second group of input elements exposed when said display is in both said open position and said closed position.

10. The apparatus as in claim 9 wherein said second group of input elements comprise a rotatable input knob and a set of input buttons.

11. The apparatus as in claim 10 wherein said rotatable input knob is configured to scroll between items within a list.

12. The apparatus as in claim 11 wherein one of said input buttons is configured to select items within said list.

13. The apparatus as in claim 12 wherein one of said input buttons is configured to back out of selected items.

14. The apparatus as in claim 10 wherein said input buttons and input knob are user-programmable.

15. An apparatus, comprising:
    a data processing device;

a display; and display guiding means comprising a swing arm having a first end and a second end, rotatably coupled to said data processing device at said first end and rotatably coupled to said display at said second end, the swing arm rotatable through a specified angle from a first position to a second position thereby moving said display between a closed position and an open position;

a track formed on said processing device; and a pin formed on said display cooperatively engaged with said track to guide said display from said closed position to said open position, wherein in said closed position said display covers a first group of input elements on said data processing device and wherein in said open position said display exposes said first group of input elements on said data processing device;

wherein said display remains in substantially the same plane defined by the length and width of said display as it is moved from said closed to said open position.

16. The apparatus as in claim 15 wherein said plane is co-planar with a plane defined by a length and width of said data processing device.

* * * * *